United States Patent
Ramachandran et al.

(10) Patent No.: US 11,436,481 B2
(45) Date of Patent: Sep. 6, 2022

(54) SYSTEMS AND METHODS FOR NAMED ENTITY RECOGNITION

(71) Applicant: salesforce.com, inc., San Francisco, CA (US)

(72) Inventors: Govardana Sachithanandam Ramachandran, San Francisco, CA (US); Michael Machado, San Francisco, CA (US); Shashank Harinath, San Francisco, CA (US); Linwei Zhu, San Francisco, CA (US); Yufan Xue, San Francisco, CA (US); Abhishek Sharma, San Francisco, CA (US); Jean-Marc Soumet, San Jose, CA (US); Bryan McCann, San Francisco, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 985 days.

(21) Appl. No.: 16/134,957

(22) Filed: Sep. 18, 2018

(65) Prior Publication Data
US 2020/0090033 A1 Mar. 19, 2020

(51) Int. Cl.
*G06N 3/08* (2006.01)
*G06F 16/35* (2019.01)
*G06F 40/00* (2020.01)

(52) U.S. Cl.
CPC ............. *G06N 3/08* (2013.01); *G06F 16/358* (2019.01); *G06F 40/00* (2020.01)

(58) Field of Classification Search
CPC ......... G06N 3/08; G06F 16/358; G06F 40/00; G06F 40/295
See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 9,442,778 B2 | 9/2016 | Desai et al. | |
| D776,682 S | 1/2017 | Kim et al. | |
| D784,397 S | 4/2017 | Kim et al. | |

(Continued)

OTHER PUBLICATIONS

Le et al., "Application of a Hybrid Bi-LSTM-CRF Model to the Task of Russian Named Entity Recognition", Nov. 28, 2017, AINL 2017, CCIS 789, pp. 91-103. (Year: 2017).*

(Continued)

*Primary Examiner* — Ying Yu Chen
(74) *Attorney, Agent, or Firm* — Haynes and Boone, LLP

(57) ABSTRACT

A method for natural language processing includes receiving, by one or more processors, an unstructured text input. An entity classifier is used to identify entities in the unstructured text input. The identifying the entities includes generating, using a plurality of sub-classifiers of a hierarchical neural network classifier of the entity classifier, a plurality of lower-level entity identifications associated with the unstructured text input. The identifying the entities further includes generating, using a combiner of the hierarchical neural network classifier, a plurality of higher-level entity identifications associated with the unstructured text input based on the plurality of lower-level entity identifications. Identified entities are provided based on the plurality of higher-level entity identifications.

20 Claims, 9 Drawing Sheets

(56) References Cited

U.S. PATENT DOCUMENTS

| | | |
|---|---|---|
| D784,409 S | 4/2017 | Kim et al. |
| D808,985 S | 1/2018 | Kim et al. |
| 9,881,076 B2 | 1/2018 | Louie et al. |
| D809,556 S | 2/2018 | Kim et al. |
| 9,971,763 B2 * | 5/2018 | Abdel-Reheem ..... G06F 40/295 |
| 10,146,581 B2 | 12/2018 | Rapp et al. |
| 10,146,597 B2 | 12/2018 | Pack, III et al. |
| 10,148,640 B2 | 12/2018 | Desai et al. |
| 10,282,663 B2 | 5/2019 | Socher et al. |
| 10,341,279 B2 | 7/2019 | Seymour et al. |
| 10,346,721 B2 | 7/2019 | Albright et al. |
| 10,353,905 B2 | 7/2019 | Ramachandran et al. |
| 10,354,264 B2 | 7/2019 | Jagota et al. |
| 2016/0140355 A1 | 5/2016 | Jagota et al. |
| 2016/0350653 A1 | 12/2016 | Socher et al. |
| 2017/0024645 A1 | 1/2017 | Socher et al. |
| 2017/0032280 A1 | 2/2017 | Socher et al. |
| 2017/0060919 A1 | 3/2017 | Ramachandran et al. |
| 2017/0070557 A1 | 3/2017 | Kim et al. |
| 2017/0091651 A1 * | 3/2017 | Miao ..................... G06F 8/65 |
| 2017/0091652 A1 * | 3/2017 | Miao ..................... G06N 20/00 |
| 2017/0097742 A1 | 4/2017 | Kim et al. |
| 2017/0140240 A1 | 5/2017 | Socher et al. |
| 2017/0316361 A1 | 11/2017 | Jagota et al. |
| 2018/0082171 A1 | 3/2018 | Merity et al. |
| 2018/0096219 A1 | 4/2018 | Socher |
| 2018/0097880 A1 | 4/2018 | Chan et al. |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129737 A1 | 5/2018 | Louie et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0225317 A1 | 8/2018 | Lalani et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0300400 A1 | 10/2018 | Paulus |
| 2018/0307709 A1 | 10/2018 | Lalani et al. |
| 2018/0307737 A1 | 10/2018 | Lalani et al. |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0357100 A1 | 12/2018 | Lalani et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0138946 A1 | 5/2019 | Asher et al. |
| 2019/0147076 A1 | 5/2019 | Yang et al. |
| 2019/0149834 A1 | 5/2019 | Zhou et al. |
| 2019/0188568 A1 | 6/2019 | Keskar et al. |
| 2019/0220530 A1 | 7/2019 | Motwani et al. |
| 2019/0228363 A1 | 7/2019 | Badarinath et al. |
| 2019/0236504 A1 | 8/2019 | Lalani et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258904 A1 * | 8/2019 | Ma ..................... G06K 9/6269 |
| 2019/0258939 A1 | 8/2019 | Min et al. |
| 2019/0272335 A1 | 9/2019 | Liu et al. |
| 2019/0370326 A1 * | 12/2019 | Andreica .............. G06F 16/322 |

OTHER PUBLICATIONS

Kim et al., "Two-Phase Biomedical Named Entity Recognition Using a Hybrid Method", 2005, IJCNLP 2005, LNAI 3651, pp. 646-657. (Year: 2005).*

Chen et al., "Attention-based Hierarchical Neural Query Suggestion", Jun. 27, 2018, SIGIR '18: The 41st International ACM SIGIR Conference on Research & Development in Information Retrieval, pp. 1093-1096. (Year: 2018).*

Xu et al., "Neural Fine-Grained Entity Type Classification with Hierarchy-Aware Loss", Apr. 14, 2018, arXiv:1803.03378v2, pp. 1-10. (Year: 2018).*

* cited by examiner

600

Met with Chris Quintana of Acme for lunch at Chez Cuisine at 11:30 AM EDT.

|     | Type of Entity 650 | Value of Entity 652 | Confidence Level 654 |
| --- | --- | --- | --- |
| 656 | Person | Chris Quintana | 90% |
| 658 | Orgnization | Acme | 85% |
| 660 | Location | Chez Cuisine | 95% |
| 662 | Time | 11:30 AM EDT | 95% |

*FIG. 6B*

|  | Type of Entity 650 | Value of Entity 652 | Confidence Level 654 |
|---|---|---|---|
| 750 | Time | 11:30 AM EDT | 100% |

|  | Type of Entity 650 | Value of Entity 652 | Confidence Level 654 |
|---|---|---|---|
| 656 | Person | Chris Quintana | 90% |
| 658 | Orgnization | Acme | 85% |
| 660 | Location | Chez Cuisine | 95% |
| 750 | Time | 11:30 AM EDT | 100% |

SYSTEMS AND METHODS FOR NAMED ENTITY RECOGNITION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to systems and methods for named entity recognition (NER) using unstructured input.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

It is not uncommon for a multi-tenant database system to store data for different tenants according to tenant-specific schemas and/or data arrangements. This creates a database that encompasses multiple data stores that are heterogeneous because each of the data stores store different information according to the different schemas and/or data arrangements. This presents a challenge to both users and developers as the users are often constrained to enter new data and/or specify data changes using a structured approach built around a user interface that is typically constrained by the schema of the underlying data store.

Accordingly, it would be advantageous to have improved methods and systems that users may use to specify additions and/or changes to data, and, more specifically, methods and systems that provide improved named entity recognition using unstructured input which may allow users to specify the additions and/or changes more accurately and efficiently.

BRIEF DESCRIPTION OF THE DRAWINGS

FIG. 6A is a simplified diagram of an example of unstructured natural language input according to some embodiments; FIG. 6B is a simplified diagram of identified entities of the unstructured natural language input of FIG. 6A according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Figure 1:
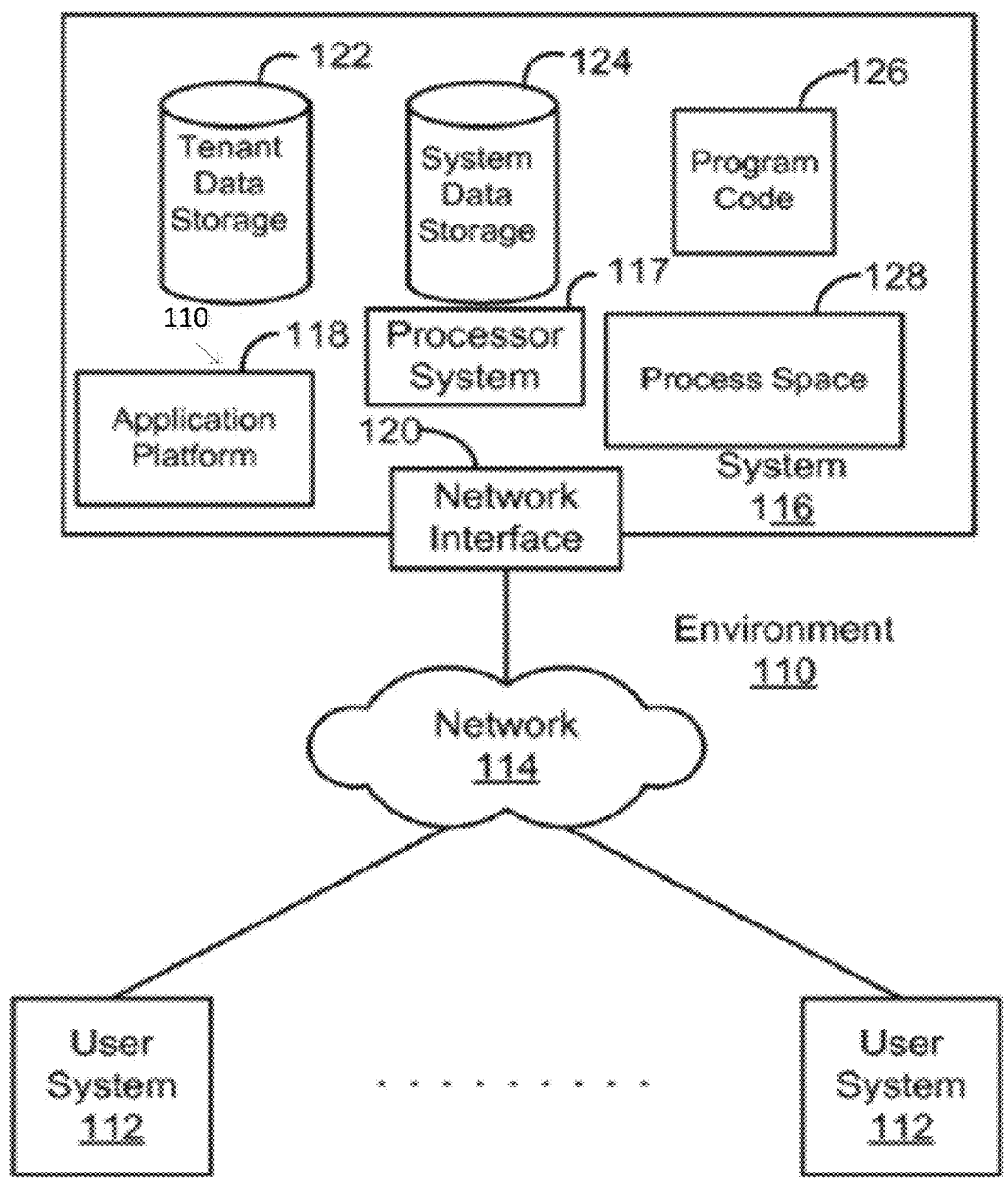
FIG. 1 is a simplified diagram of a computing system according to some embodiments.

FIG. 1 is a simplified diagram of a computing system 110 according to some embodiments. As shown in FIG. 1, computing system 110 includes user systems 112, network 114, database system 116, processor system 117, application platform 118, network interface 120, tenant data storage 122, system data storage 124, program code 126, and process space 128 for executing database system processes and tenant-specific processes, such as running applications as part of an application hosting service. In some embodiments, computing system 110 may not have all of the components listed and/or may have other elements instead of, or in addition to, those listed above.

In some embodiments, the computing system 110 provides an on-demand database service for multiple users and/or tenants. A user system 112 may be any machine or system that is used by a user to access a database user system. In some examples, any of user systems 112 may be a handheld computing device, a mobile phone, a laptop computer, a notepad computer, a work station, a network of computing devices, and/or the like. As illustrated in FIG. 1 (and in more detail in FIG. 2) user systems 112 might interact via a network 114 with an on-demand database service, which is database system 116.

An on-demand database service, such as that which can be implemented using the database system 116, is a service that is made available to users outside of the enterprise(s) that own, maintain or provide access to the database system 116. As described above, such users do not have to be concerned with building and/or maintaining the database system 116. Instead, resources provided by the database system 116 may be available for use by the users when the users need services provided by the database system 116 (e.g., on the demand of the users). Some on-demand database services may store information from one or more tenants stored into tables of a common database image to form a multi-tenant database system (MTS). Accordingly, the "on-demand database service 116" and the "database system 116" will be used interchangeably herein. The term "multi-tenant database system" can refer to those systems in which various elements of hardware and/or software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) and/or the equivalent may execute storage and retrieval of information against the data base object(s).

The application platform 118 may be a framework that allows the applications of database system 116 to run, such as the hardware and/or software infrastructure, such as the operating system. In some embodiments, on-demand database service 116 may include an application platform 118 that enables creating, managing, and/or executing of one or more applications developed by the provider of the on-demand database service, users accessing the on-demand database service via user systems 112, and/or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with database system 116, that user system 112 has the capacities allotted to that salesperson. However, while an administrator is using that user system 112 to interact with database system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 MAY be any one or any combination of one or more local area networks (LANs), one or more wide area networks (WANs), one or more telephone networks, one or more wireless networks, one or more point-to-point networks, one or more star networks, one or more token ring networks, one or more hub networks, and/or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that network 114 is not so limited and other network protocols may be supported.

User systems 112 may communicate with database system 116 using TCP/IP and, at a higher network level, use other common Internet protocols to communicate. Such as one or more of hypertext transfer protocol (HTTP), file transfer protocol (FTP), Andrew file system (AFS), wireless application protocol (WAP), and/or the like. In some examples where HTTP is used, user system 112 may include an HTTP client commonly referred to as a "browser" for sending and receiving HTTP messages to and from an HTTP server at database system 116. Such an HTTP server might be implemented as the sole network interface between database system 116 and network 114, but other techniques might be used as well and/or instead. In some implementations, the interface between database system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, database system 116 as shown in FIG. 1, implements a web-based customer relationship management (CRM) system. In some embodiments, database system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In some embodiments, database system 116 implements applications other than, or in addition to, a CRM application. In some examples, database system 116 may provide tenant access to multiple hosted (standard and custom) applications, including a CRM application. User and/or third party developer applications, which may or may not include CRM, may be supported by the application platform 118, which manages creation, storage of the applications into one or more database objects, and/or executing of the applications in a virtual machine in the process space of the database system 116.

One arrangement for elements of database system 116 is shown in FIG. 1, including network interface 120, application platform 118, tenant data storage 122 for tenant data 123, system data storage 124 for system data 125 accessible to database system 116 and possibly multiple tenants, program code 126 for implementing various functions of the database system 116, and process space 128 for executing MTS system processes and tenant-specific processes, such as running applications as part of an application hosting service. Additional processes that may execute on database system 116 include database indexing processes.

Several elements in computing system 110 as shown in FIG. 1 include conventional, well-known elements that are explained only briefly here. For example, each of the user systems 112 may include a desktop personal computer, workstation, laptop, notepad computer, PDA, cell phone, or any wireless access protocol (WAP) enabled device or any other computing device capable of interfacing directly or indirectly to the Internet or other network connection. Each of user systems 112 typically runs an HTTP client (e.g., a browsing program, such as Microsoft's Internet Explorer browser, Netscape's Navigator browser, Opera's browser, a WAP-enabled browser in the case of a cell phone, notepad computer, PDA or other wireless device, and/or the like) allowing a user (e.g., subscriber of the multi-tenant database system) of the user systems 112 to access, process, and/or view information, pages, and/or applications available to it from database system 116 over network 114. Each of user systems 112 also typically includes one or more user interface devices (e.g., a keyboard, a mouse, trackball, touch pad, touch screen, pen, and/or the like) for interacting with a graphical user interface (GUI) provided by the browser on a display (e.g., a monitor screen, liquid crystal display (LCD) monitor, light emitting diode (LED) monitor, organic light emitting diode (OLED) monitor, and/or the like) in conjunction with pages, forms, applications, and/or other information provided by database system 116 and/or other systems and/or servers. In some examples, the user interface device may be used to access data and/or applications hosted by database system 116, to perform searches on stored data, and/or allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN, and/or the like.

According to some embodiments, each of user systems 112 and its components are operator configurable using applications, such as a browser, including computer code run using a central processing unit such as an Intel Pentium® processor or the like. Similarly, database system 116 (and additional instances of an MTS, where more than one is present) and their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring database system 116 to intercommunicate and/or to process webpages, applications and/or other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium (e.g., over the Internet and/or from another server, as is well known) and/or transmitted over any other conventional network connection as is well known (e.g., extranet, virtual private network (VPN), LAN, and/or the like) using any communication medium and/or protocols (e.g., TCP/IP, HTTP, HTTPS, Ethernet, and/or the like) as are well known. It will also be appreciated that computer code for implementing embodiments of the present invention may be implemented in any programming language that is executable on a client system and/or server or server system such as, for example, C, C++, HTML, any other markup language, Java™, JavaScript, ActiveX, any other scripting language (e.g., VBScript), and/or many other programming languages as are well known may be used. (Java™ is a trademark of Sun MicroSystems, Inc.).

According to some embodiments, database system 116 is configured to provide webpages, forms, applications, data, and/or media content to the user (client) systems 112 to support the access by user systems 112 as tenants of database system 116. As such, database system 116 provides security mechanisms to keep each tenant's data separate unless the data is shared. If more than one MTS is used, they may be located in close proximity to one another (e.g., in a server farm located in a single building and/or campus), and/or they may be distributed at locations remote from one another (e.g., one or more servers located in city A and/or one or more servers located in city B). In some embodiments, each MTS may include one or more logically and/or physically connected servers distributed locally and/or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database objects described herein may be implemented as single databases, a distributed database, a collection of distributed databases, and a database with redundant online and/or offline backups, other redundancies, and/or the like. In some examples, the database objects may be implemented using a distributed database and/or storage network and associated processing intelligence.

Figure 2:
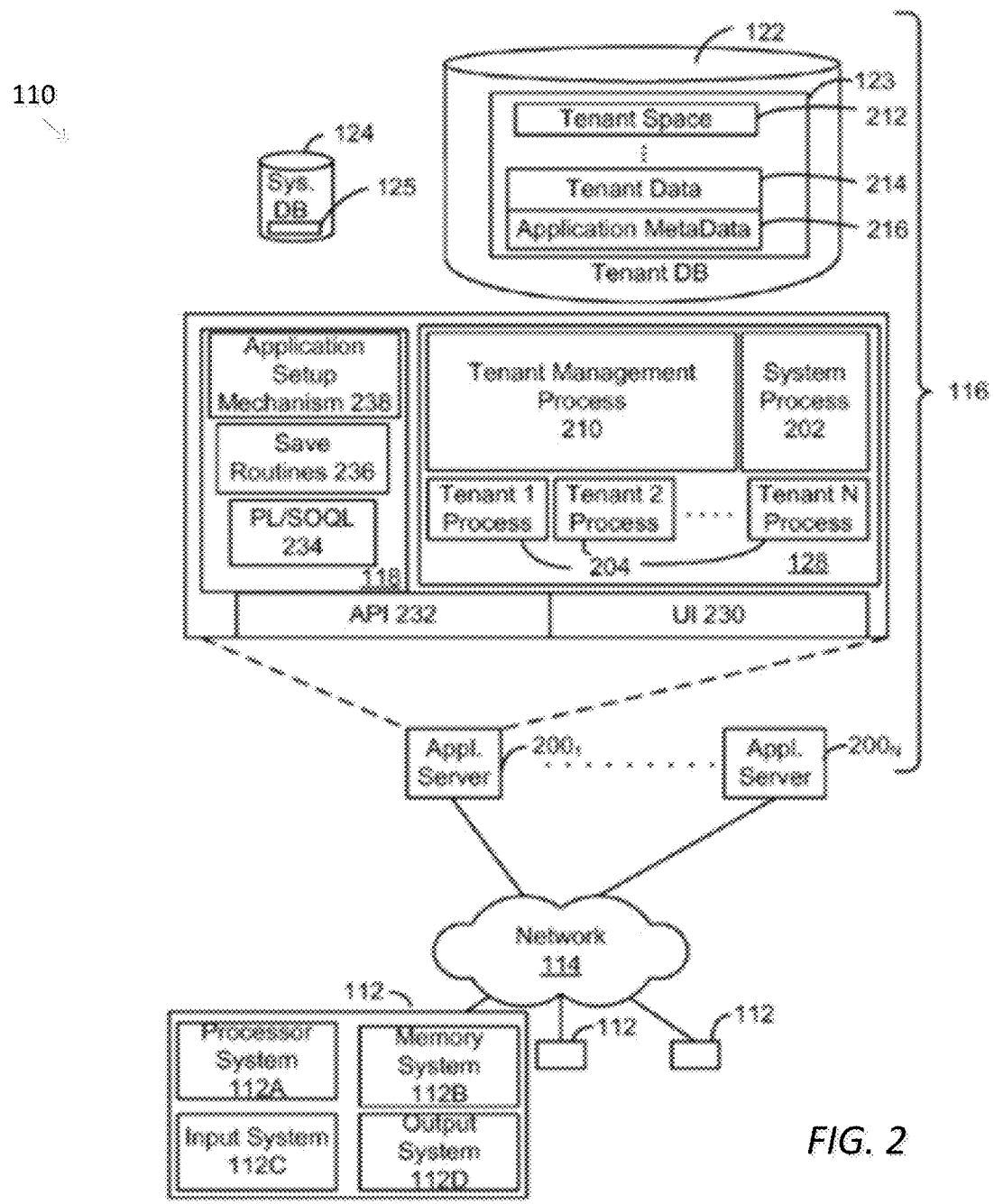
FIG. 2 is a simplified diagram of another computing system according to some embodiments.

FIG. 2 is a simplified diagram of computing system 110 according to additional embodiments. As shown in FIG. 2, each of user systems 112 may include a processor system 112A, a memory system 112B, an input system 112C, and an output system 112D. FIG. 2 additionally shows network 114 and database system 116. FIG. 2 also shows that database system 116 may include tenant data storage 122, tenant data 123, system data storage 124, system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In some embodiments, computing system 110 may not have the same elements as those listed above and/or may have other elements instead of, or in addition to, those listed above.

User systems 112, network 114, database system 116, tenant data storage 122, and system data storage 124 are described in further detail above with respect to FIG. 1. Regarding user systems 112, processor system 112A may be any combination of one or more processors, microprocessors, multicore processors, graphics processing units (GPUs), tensor processing units (TPUs), application-specific integrated circuits (ASICs), field-programmable gate arrays (FPGAs), and/or the like. Memory system 112B may include any combination of one or more memory devices, short term, and/or long term memory. In some examples, each of the one or more memory devices may include machine-readable media, such as floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Input system 112C may be any combination of input devices, such as one or more keyboards, mice, trackballs, scanners, cameras, interfaces to networks, and/or the like. Output system 112D may be any combination of output devices, such as one or more monitors, printers, interfaces to networks, and/or the like.

As shown in FIG. 2, database system 116 may include network interface 120 of FIG. 1 implemented as a set of HTTP application servers 200, application platform 118, tenant data storage 122, and/or system data storage 124. Also shown is system process space 202, including individual tenant process spaces 204 and tenant management process space 210. Each application server 200 may be configured to access tenant data storage 122 and the tenant data 123 therein and the system data storage 124 and the system data 125 therein to serve requests of user systems 112. In some examples, the tenant data 123 may be divided into individual tenant storage areas 212, which can be either a physical arrangement and/or a logical arrangement of data. In some examples, within each tenant storage area 212, user storage 214 and application metadata 216 may be allocated for each user. In some examples, a copy of a user's most recently used (MRU) items may be stored in user storage 214. In some examples, a copy of MRU items for an entire organization (e.g., a tenant) me be stored to tenant storage area 212.

UI 230 provides a user interface and API 232 provides an application programmer interface to database system 116 resident processes and to users and/or developers at user systems 112. The tenant data 123 and the system data 125 may be stored in various databases, such as one or more Oracle™ databases.

Application platform 118 includes an application setup mechanism 238 that supports application developers' creation and/or management of applications. In some examples, application setup mechanism 238 may save metadata into tenant data storage 122 by save routines 236 for execution by subscribers as one or more tenant process spaces 204 managed by tenant management process 210. In some examples, invocations to such applications may be coded using PL/SOQL 234 that provides a programming language style interface extension to API 232. Some embodiments of PL/SOQL language are discussed in further detail in U.S. Pat. No. 7,730,478, filed Sep. 21, 2007, entitled, "Method and System for Allowing Access to Developed Applications via a Multi-Tenant On-Demand Database Service," which is incorporated herein by reference. In some examples, invocations to applications may be detected by one or more system processes, which manage retrieving application metadata 216 for the subscriber, making the invocation and executing the metadata as an application in a virtual machine.

Each application server 200 may be communicably coupled to database systems (e.g., having access to system data 125 and tenant data 123) via a different network connection. In some examples, one application server $200_1$ may be coupled via network 114, another application server $200_{N-1}$ may be coupled via a direct network link, and another application server $200_N$ may be coupled by yet a different network connection. TCP/IP includes typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5

Big-IP load balancer) is communicably coupled between application servers 200 and user systems 112 to distribute requests to application servers 200. In some embodiments, the load balancer uses a least connections algorithm to route user requests to application servers 200. Other examples of load balancing algorithms, such as round robin, observed response time, and/or the like may also be used. In some embodiments, three consecutive requests from a same user could be handled by three different application servers 200, and three requests from different users could be handled by a same application server 200. In this manner, database system 116 is multi-tenant, wherein database system 116 handles storage of and/or access to different objects, data and/or applications across disparate users and/or organizations.

As an example of storage, one tenant might be a company that employs a sales force where each salesperson uses database system 116 to manage his or her sales process. Thus, a user might maintain contact data, leads data, customer follow-up data, performance data, goals progress data, and/or the like that are applicable to that user's personal sales process (e.g., in tenant data storage 122). In some examples of a MTS arrangement, a user may manage his or her sales efforts and cycles from any of many different user systems because the data and/or the applications to access, view, modify, report, transmit, calculate, and/or the like may be maintained and/or accessed by a user system 112 having nothing network access. In some examples, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there may be some data structures managed by database system 116 that are allocated at the tenant level while other data structures may be managed at the user level. Because a MTS might support multiple tenants including possible competitors, the MTS should additionally have security protocols that keep data, applications, and/or application use separate. Also, because many tenants may opt for access to a MTS rather than maintain their own system, redundancy, up-time, and/or backup are additional functions that may be implemented in the MTS. In addition to user-specific data and tenant specific data, database system 116 may also maintain system level data usable by multiple tenants and/or other data. Such system level data may include industry reports, news, postings, and/or the like that are sharable among tenants.

In certain embodiments, user systems 112 (which may be client systems) communicate with application servers 200 to request and/or update system-level and/or tenant-level data from database system 116 that may involve sending one or more queries to tenant data storage 122 and/or system data storage 124. Database system 116 (e.g., an application server 200 in database system 116) automatically generates one or more structured query language (SQL) statements (e.g., one or more SQL queries) that are designed to access and/or modify the desired information. System data storage 124 may generate query plans to access the requested data from the database.

Each database can generally be viewed as a collection of objects, such as a set of logical tables, containing data fitted into predefined categories as characterized by a schema. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table may describe a purchase order, including fields for information such as customer, product, sale price, date, etc. In some multi-tenant database systems, standard entity tables might be provided for use by all tenants. For CRM database applications, such standard entities might include tables for Account, Contact, Lead, and/or Opportunity data, each containing pre-defined fields. It should be understood that the word "entity" may also be used interchangeably herein with "object" and "table."

In some multi-tenant database systems, tenants may be allowed to create and store custom objects, and/or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In some embodiments, custom entity data rows characterized by custom schemas may be stored in a single multi-tenant physical table, which may contain multiple logical tables per organization. It is transparent to customers that their multiple "tables" are in fact stored in one large table or that their data may be stored in a same table as the data of other customers.

Further examples of environments in which the systems and method of present disclosure may operate can be found in concurrently filed U.S. patent application entitled "Using Unstructured Input to Update Heterogeneous Data Stores," filed on Sep. 18, 2018, and U.S. patent application entitled "Determining Intent from Unstructured Input to Update Heterogeneous Data Stores", the entirety of which is incorporated by reference herein.

A database system, such as the multi-tenant database system 116 described above, can store data or information for a wide variety of items (such as business accounts, business leads, contacts for the business accounts and leads, a contact's given name, family name, job title, employer name, street address, city, state, zip code, e-mail address, telephone number, etc.) and in a wide variety of forms (different schemas and/or data arrangements). Furthermore, the database system may be accessed and used by a number of customers, clients, or other persons (generally, "users"), regarding some action item that the user intends to be taken with respect to updating or modifying the database system. For example, the user may intend to create a new entry (e.g., for a contact or calendar item) in the database. As another example, the user may intend to delete an existing entry (e.g., if a particular company is no longer a customer). Or, as yet another example, the user may intend to modify or update an existing entry (e.g., if the contact person for a customer has changed).

The typical user of an information database system does not know how the data is organized in the database nor its forms or schema. Thus, some provision must be made to enable, allow, or direct the user to the appropriate location (virtual or real) for the data or information item, record, object, or entry or to be modified, created, deleted, or updated. For this, it is typical to provide a user interface (UI) that presents the user with a series of forms or fields (e.g., on one or more screens, webpages, or interactive dialogues) to fill in or complete to so that the desired information or items can be accessed, retrieved, modified, updated, deleted, stored, or otherwise processed according to the intent of the user. For some users, such a fill-in-the-blank approach to interacting with an information database system is inefficient and is often frustrating.

Figure 3:
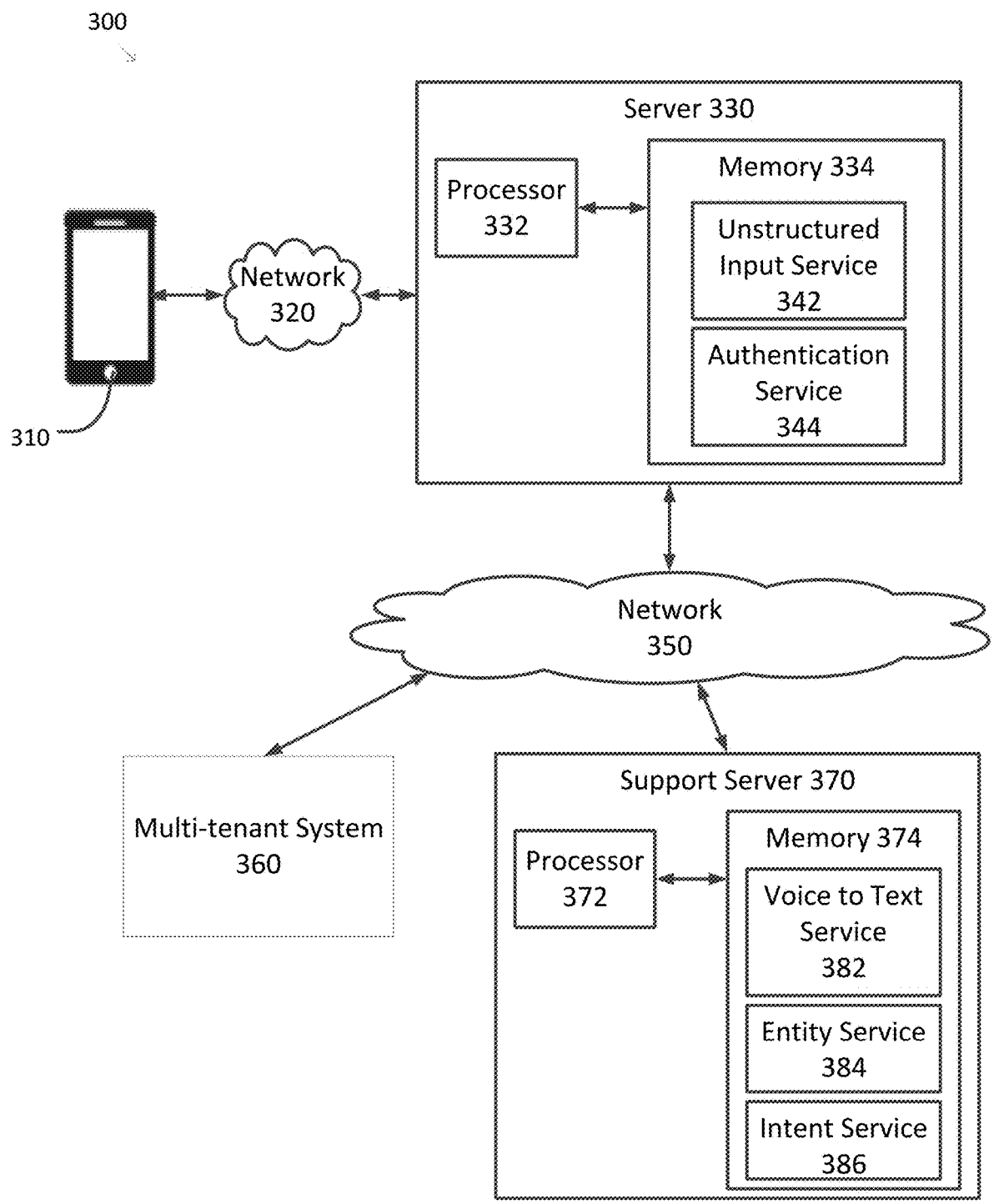
FIG. 3 is a simplified diagram of a computing system for supporting unstructured input according to some embodiments.
Figures 7A, 7B, 7C:
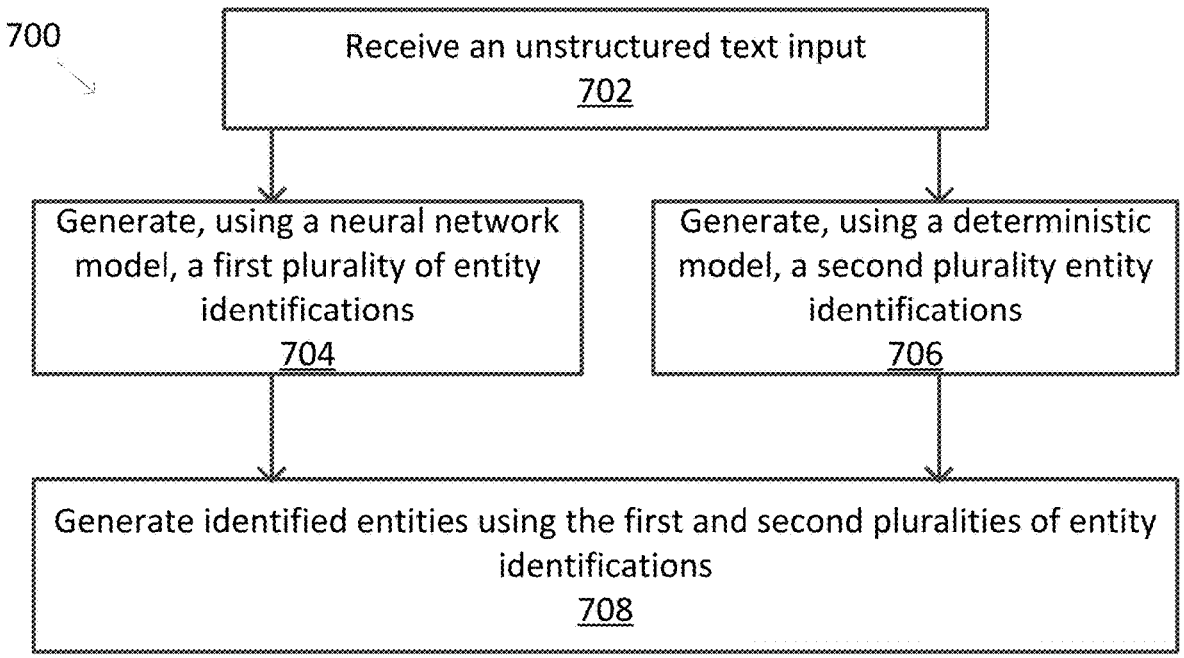
FIG. 7A is a simplified diagram of a method of providing entity recognition according to some embodiments.
FIG. 7B is a simplified diagram of deterministic entity identifications according to some embodiments.
FIG. 7C is a simplified diagram of identified entities according to some embodiments.
Figure 8:
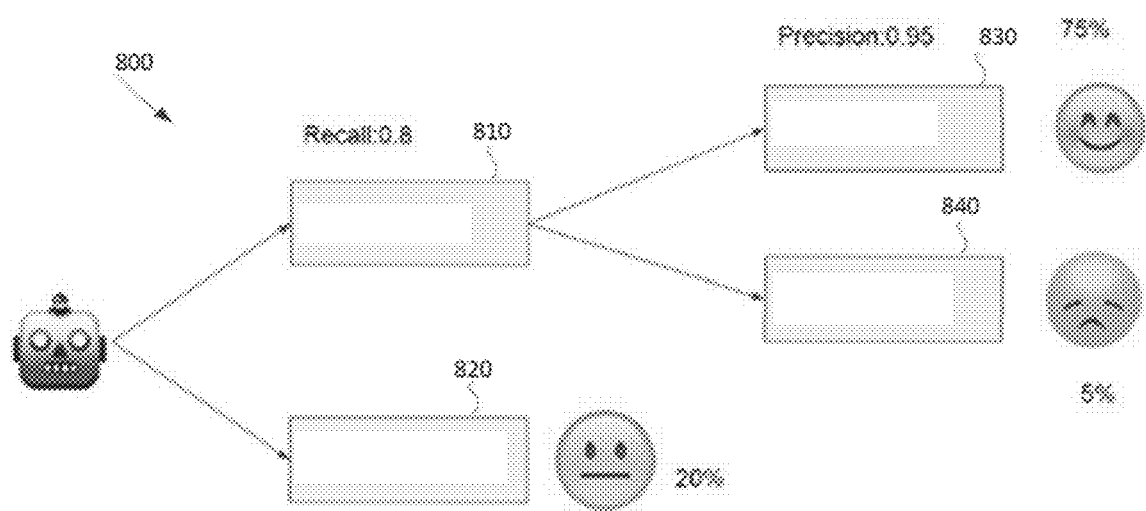
FIG. 8 illustrates a decision flow for presenting a user with entity recognition based on confidence level according to some embodiments.
Figure 9:
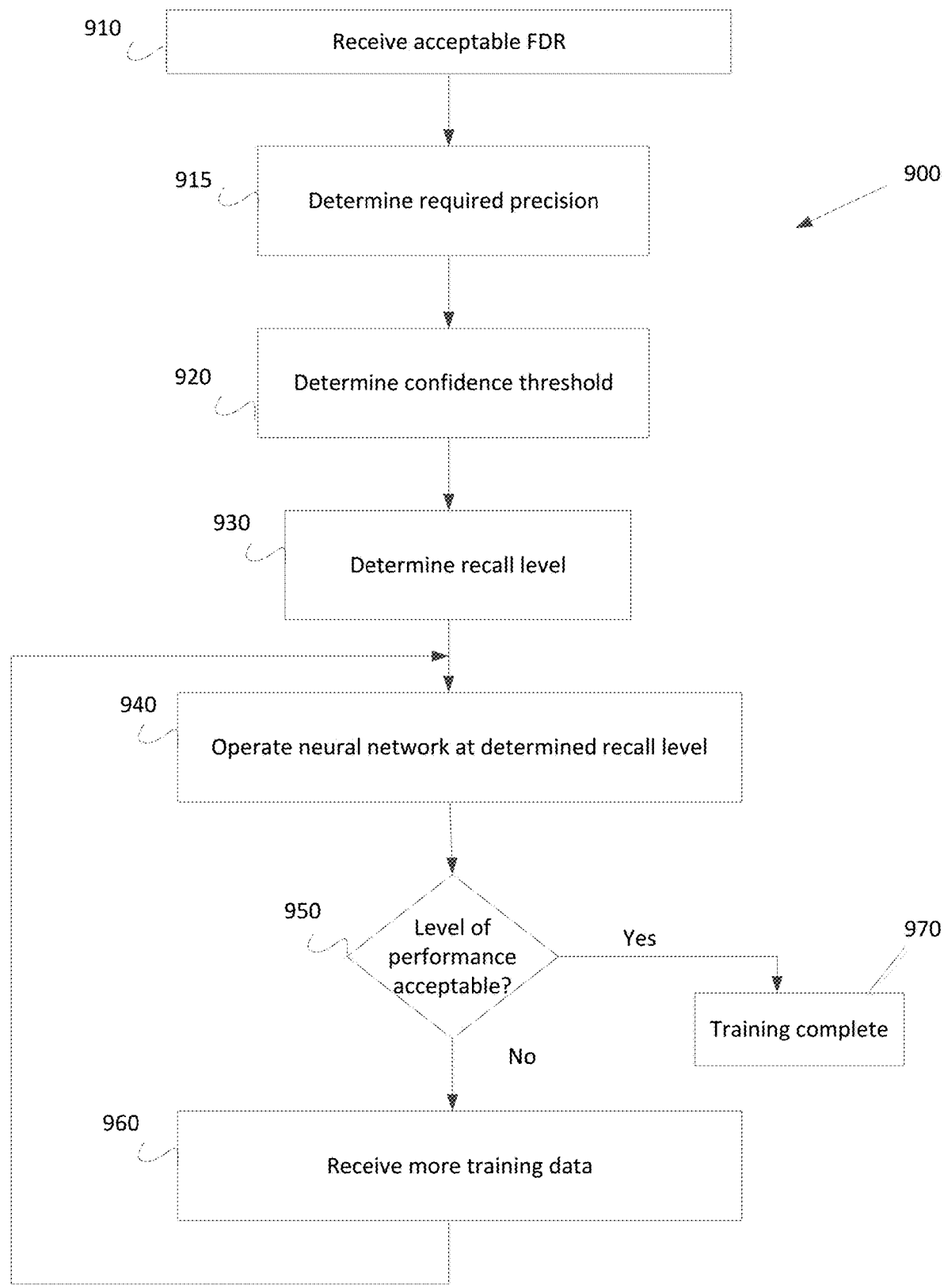
FIG. 9 is a flowchart of a method for configuring the training of a neural network according to some embodiments.

Recently, it has become increasingly more commonplace and desirable to allow human users to interact with machines, such as the database system, using language that mirrors, follows, replicates, or is similar to the way that humans interact with each other—i.e., "natural language." One important task in natural language processing is named entity recognition, also referred to as entity recognition or entity identification in the descriptions herein. As described in FIGS. 3 through 9 below, systems and methods for entity recognition are described. FIG. 3 illustrates an example computing system 300 for supporting unstructured input with entity recognition. FIGS. 4, 5, 6A, and 6B illustrate systems and methods for entity recognition using neural network models. FIGS. 7A, 7B, and 7C illustrate systems and methods for entity recognition using a hybrid structure that includes both entity recognition models using neural network models and entity recognition models without using neural network structures (e.g., a deterministic model using rules or regular expressions). FIGS. 8 and 9 illustrate systems and methods for entity recognition using a confidence threshold.

FIG. 3 is a simplified diagram of a computing system 300 for supporting unstructured input according to some embodiments. As shown in FIG. 3, users interact with computing system 300 via a user device 310. In some examples, user device 310 may be consistent with a smartphone and/or other portable computing device. In some examples, user device 310 may be consistent with one of user systems 112. In some examples, user device 310 may include one or more applications (e.g., a web browser and/or one or more custom applications) for accessing the services provided by computing system 300.

As shown, user device 310 is coupled via a network 320 to a server 330. In some examples, network 320 may include one or more sub-networks, such as a cellular network, a mesh network, a wireless network, a local area network, a wide area network, and/or the like. In some examples, network 320 may be consistent with network 114.

Server 330 includes a processor 332 coupled to memory 334. Operation of server 330 is controlled by processor 332. And although server 330 is shown with only one processor 332, it is understood that processor 332 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in server 330. Server 330 may be implemented as a stand-alone subsystem, as a board added to a computing device, and/or as a virtual machine.

Memory 334 may be used to store software executed by server 330 and/or one or more data structures used during operation of server 330. Memory 334 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 332 and/or memory 334 may be arranged in any suitable physical arrangement. In some embodiments, processor 332 and/or memory 334 may be implemented on a same board, in a same package (e.g., system-in-package), on a same chip (e.g., system-on-chip), and/or the like. In some embodiments, processor 332 and/or memory 334 may include distributed, virtualized, and/or containerized computing resources. Consistent with such embodiments, processor 332 and/or memory 334 may be located in one or more data centers and/or cloud computing facilities.

As shown, memory 334 includes an unstructured input service 342 and an authentication service 344. Unstructured input service 342 is responsible for receiving unstructured input from the user of user device 310, analyzing the unstructured input using a template, and making one or more updates to a database or data store based on the analysis of the unstructured input as is described in further detail below. Authentication service 344 provides authentication support for authenticating users and/or user devices (e.g., user device 310) to prevent authorized access to unstructured input service 342 and/or the underlying databases or data stores. In some examples, authentication service 344 receives one or more credentials from a user and/or a user device (e.g., username, password, authentication token, and/or the like) to authenticate the user and/or the user device. In some examples, authentication service 344 may facilitate access by the user and/or unstructured input service 342 to the underlying databases and/or data stores, such as by generating one or more database connection strings and/or the like.

In some examples, memory 334 may include non-transitory, tangible, machine readable media that includes executable code that when run by one or more processors (e.g., processor 332) may cause the one or more processors to perform one or more processes associated with unstructured input service 342 and/or authentication service 344 as is described in further detail below. In some examples, unstructured input service 342 and/or authentication service 344 may be implemented using hardware, software, and/or a combination of hardware and software. In some examples, unstructured input service 342 and/or authentication service 344 may include one or more APIs, web services, and/or the like (e.g., a HTTP service) for providing user applications with access to the services of unstructured input service 342 and/or authentication service 344.

Server 330 and the services hosted by server 330 (e.g., unstructured input service 342, authentication service 344, and/or the like) are coupled via a network 350 to a multi-tenant system 360 and a support server 370. In some examples, network 350 may include one or more sub-networks, such as a cellular network, a mesh network, a wireless network, a local area network, a wide area network, and/or the like. In some examples, network 350 may be consistent with network 114.

Multi-tenant system 360 includes the computing devices and infrastructure (e.g., one or more processors, one or more storage devices, one or more platforms, one or more processes, and/or the like) for providing server 330 and unstructured input service 342 with access to one or multi-tenant databases and/or data stores. In some examples, multi-tenant system 360 may be consistent with database system 116 as described previously with respect to FIGS. 1 and/or 2.

Support server 370 includes a processor 372 coupled to memory 374. Operation of support server 370 is controlled by processor 372. And although support server 370 is shown with only one processor 372, it is understood that processor 372 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in support server 370. Support server 370 may be implemented as a stand-alone subsystem, as a board added to a computing device, and/or as a virtual machine.

Memory 374 may be used to store software executed by support server 370 and/or one or more data structures used during operation of support server 370. Memory 374 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 372 and/or memory 374 may be arranged in any suitable physical arrangement. In some embodiments, processor 372 and/or memory 374 may be implemented on a same board, in a same package (e.g., system-in-package), on a same chip (e.g., system-on-chip), and/or the like. In some embodiments, processor 372 and/or memory 374 may include distributed, virtualized, and/or containerized computing resources. Consistent with such embodiments, processor 372 and/or memory 374 may be located in one or more data centers and/or cloud computing facilities.

As shown, memory 374 includes a voice to text service 382, an entity service 384, and an intent service 386. Voice to text service 382 receives an audio file (e.g., a MP3 file, and/or the like) and applies one or more speech recognition algorithms to the audio file to generate a natural language text string corresponding to the spoken words recognized in the audio file. In some examples, voice to text service 382 may utilize one or more neural networks trained to recognize speech in audio data. In some examples, voice to text service 382 may utilize one or more commonly available speech recognition libraries and/or APIs.

Entity service 384 receives a natural language text string (e.g., as output by voice to text service 382) and parses the words and/or the phrases in the natural language text string to identify one or more entities, determine a position of each of entities within the natural language text string, determine a type of each of the entities, a value for each of the entities, and/or determine a confidence level corresponding to how well entity service 384 believes it has recognized a corresponding entity and/or a type of the corresponding entity. In some examples, entity service 384 is able to recognize entities that correspond to organizations (e.g., a company), persons, monetary amounts, percentages, dates, times, locations, and/or pick-list types. In some examples, the pick-list types may correspond to an enumeration, a set of states for an object and/or entity, and/or the like. In some examples, entity service 384 may utilize one or more neural network classifiers (e.g., a hierarchical neural network classifier) to determine the type, the value, and/or the confidence level for each of the recognized entities (also referred to as identified entities). In some examples, entity service 384 may utilize one or more entity recognition models for recognizing the entities, their types, their values, and their confidence levels based on a regular expression and/or other text parsing scheme. In some examples, entity service 384 utilizes a hybrid structure that includes both entity recognition models using neural network structures and entity recognition models without using neural network structures. For example, an entity recognition model without using neural network structures may include a deterministic model (e.g., using rule and/or regular expressions) that provides precision guarantee for structured entities. Examples of implementations for entity service 384 are described in further detail below with reference to FIGS. 4-9.

Intent service 386 receives a natural language text string (e.g., as output by voice to text service 382) and parses the words and/or the phrases in the natural language text string to determine a desired intent of the natural language text string and/or a confidence in that determination. In some examples, the intent may be selected from a class of intents associated with desired data changes to a database and/or data store. In some examples, the class of intents may include one or more of inserting an entry (e.g., a record) in a database table, updating one or more fields of an entry (e.g., a record) in a database table, and/or the like. In some examples, intent service 386 may utilize one or more neural network classifiers to determine the intent and/or confidence level for the determined intent.

In some examples, memory 374 may include non-transitory, tangible, machine readable media that includes executable code that when run by one or more processors (e.g., processor 372) may cause the one or more processors to perform one or more processes associated with voice to text service 382, entity service 384, and/or intent service 386 as is described in further detail below. In some examples, voice to text service 382, entity service 384, and/or intent service 386 may be implemented using hardware, software, and/or a combination of hardware and software. In some examples, voice to text service 382, entity service 384, and/or intent service 386 may include one or more APIs, web services, and/or the like (e.g., a HTTP service) for providing user applications and/or other services (e.g., unstructured input service 342) with access to the services of voice to text service 382, entity service 384, and/or intent service 386.

As discussed above and further emphasized here, FIG. 3 is merely an example which should not unduly limit the scope of the claims. One of ordinary skill in the art would recognize many variations, alternatives, and modifications. According to some embodiments, other configurations and arrangements of computing system 300 are possible. In some examples, server 330 and/or support server 370 may be part of multi-tenant system 360. In some examples, one or more of the services hosted in server 330 and/or support server 370 may be hosted in separate servers. In some examples, network 320 and network 350 may be a same network. In some examples, network 350 may include two or more separate networks.

Figure 4:
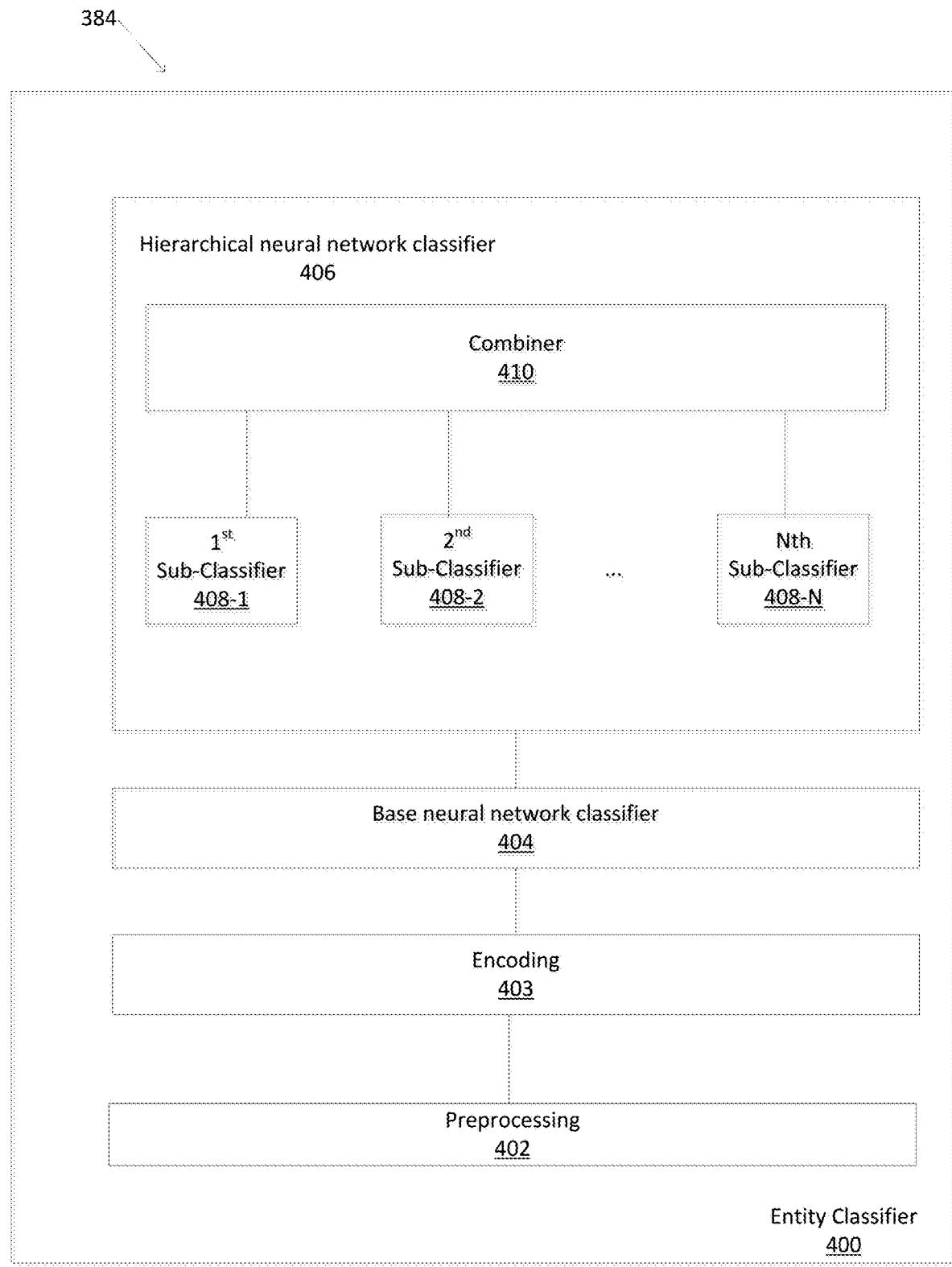
FIG. 4 is a simplified diagram of an entity classifier for providing entity recognition according to some embodiments.

Referring to FIG. 4, an example entity classifier 400 for entity recognition of entity service 384 is illustrated. The entity classifier 400 includes a preprocessing layer 402, an encoding layer 403 stacked over the preprocessing layer 402, a base neural network classifier 404 stacked over the encoding layer 403, and a hierarchical neural network classifier 406 stacked over the base neural network classifier 404.

In some embodiments, the preprocessing layer 402 receives unstructured text input sequences, such as narratives or utterances that may be entered by a user of a database system as described herein. In an example, at least a portion of the input sequence can relate to an action item that the user intends to be taken with respect to modifying the database system, such as creating, updating, modifying, or deleting a database object or record (e.g., contact, calendar item, deal, etc.). Each text input sequence comprises a sequence of words. The preprocessing layer 402 may perform word embedding and/or character embedding to generate an embedding for each word and/or character in the unstructured text input sequence. Each embedding can be a vector. In some embodiments, these can be word embeddings, such as obtained, for example, by running methods like word2vec, FastText, or GloVe, each of which defines a way of learning word vectors with useful properties. In some embodiments, the embedding may include partial word embeddings related to portions of a word. For example, the word "where" includes portions "wh," "whe," "her," "ere," and "re." Partial word embeddings can help to enrich word vectors with subword information/FastText. In some embodiments, the embeddings may include character embeddings, e.g., from FaceBook.

In some embodiments, the encoding layer 403 receives the embeddings from the preprocessing layer 402, and generates encodings based on the embeddings. The encoding layer 403 may include an encoder that learns high-level features from the words of text input sequence, and generates encodings (e.g., vectors) which map the words in the text input sequence to a higher dimensional space. The encodings may encode the semantic relationship between words. In some embodiments, the encoder is implemented with a recurrent neural network (RNN). In some embodiments, the encoder can be implemented with one or more gated recurrent units (GRUs). Various types of encoders may be used, including for example, a bidirectional long-term short-term memory (Bi-LS™) encoder.

In some embodiments, a base neural network classifier 404 receives the encodings from the encoding layer 403, and provides context information (e.g., surrounding text) associated with the text input sequence. The base neural network classifier 404 may be implemented with an RNN, including for example, a bidirectional RNN (BRNN), a bidirectional LS™ (Bi-LS™) RNN, a gated recurrent unit (GRU) RNN, and any suitable type of RNN. In some embodiments, the base neural network classifier 404 captures the syntax (or grammar) of a natural language (e.g., English) and also the context in which an entity might appear by analyzing the sentence against its entirety as against just looking at the word alone for classifying it as entity.

In some embodiments, a hierarchical neural network classifier 406 receives context information associated with the text input sequence from the base neural network classifier 404, and generates entity identifications for the text input sequence. The hierarchical neural network classifier 406 may include a plurality of parallel sub-classifiers 408-1 through 408-N, where N is any suitable integer equal to or greater than 2. Each of the sub-classifiers 408-1 through 408-N may be implemented using a neural network model including e.g., a BRNN, a bidirectional LS™ RNN, a GRU RNN, and any suitable type of RNN. Each of the sub-classifiers 408-1 through 408-N may generate lower-level entity identifications associated with the text input sequence. In an example, sub-classifier 408-1 may generate a lower-level entity identification including a conditional likelihood of P(Entity|X), and sub-classifier 408-2 may generate a lower-level entity identification including a conditional likelihood of P(Orgnization|X), where X is a particular word of the text input sequence.

In some embodiments, the neural network models of the sub-classifiers 408-1 through 408-N may be of the same type (e.g., Bi-LS™ RNN) as the neural network model of the base neural network classifier 404. In some alternative embodiments, the neural network models of the sub-classifiers 408-1 through 408-N may be of a type (e.g., one of Bi-LS™ RNN and GRU RNN) that is different from the neural network model (e.g., the other of Bi-LS™ RNN and GRU RNN) of the base neural network classifier 404.

In some embodiments, a combiner 410 of the hierarchical neural network classifier 406 may combine two or more lower-level entity identifications provided by the corresponding sub-classifiers, and generate higher-level entity identifications. In a particular example, for a word X of the text input sequence, sub-classifier 408-1 generates a lower-level entity identification including a conditional likelihood of P(Entity|X), and sub-classifier 408-2 generates a lower-level entity identification including a conditional likelihood of P(Organization|X). In that example, the combiner 410 may generate a higher-level entity identification including a joint likelihood P(Organization, Entity|X) by multiplying P(Entity|X) and P(Organization|X) based in a conditional independence assumption that P(Entity|X) and P(Organization|X) are independent. The high-level entity identification may then be used to generate an identified entity.

Figure 5:
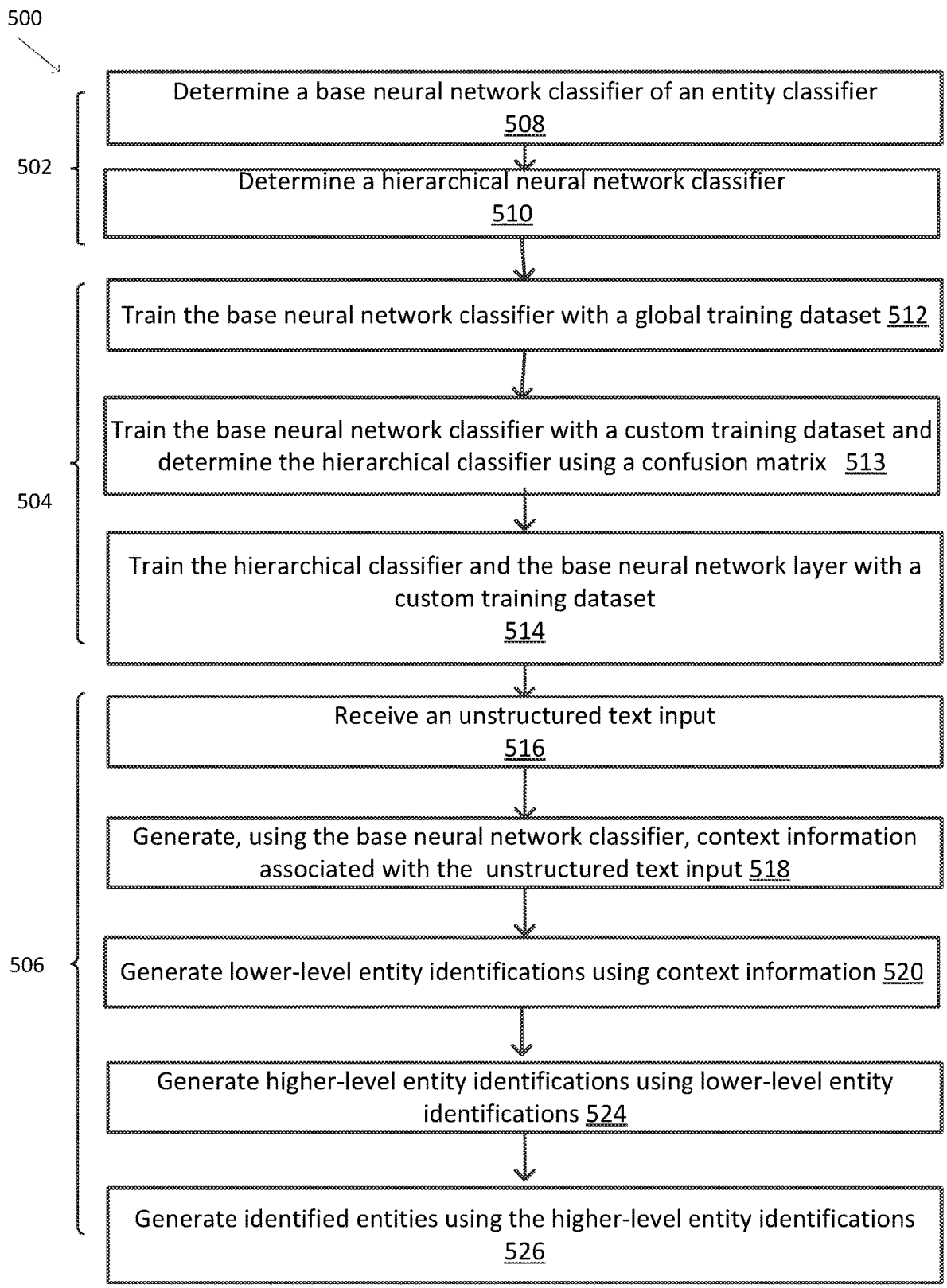
FIG. 5 is a simplified diagram of a method of providing entity recognition according to some embodiments.

Referring to FIG. 5, an example method 500 for entity recognition is illustrated. One or more of the processes 502-526 of method 500 may be implemented, at least in part, in the form of executable code stored on non-transitory, tangible, machine-readable media that when run by one or more processors may cause the one or more processors to perform one or more of the processes 502-526. In some embodiments, method 500 may be used as a service and/or combination of services for receiving unstructured audio input that includes natural language, analyzing the natural language in the unstructured audio input according to a template, and guiding a user in identifying database records that are the subject of the natural language, and preparing and has executed one or more changes to the identified database records. In some examples, at least some of the processes of method 500 may be performed by the entity service 384. In various embodiments, method 500 may be used as a service and/or combination of services for any suitable natural language process applications.

According to some embodiments, the method 500 is described in conjunction with the examples of FIG. 6A, which is a simplified diagram of an example of unstructured natural language input 600 according to some embodiments. And although method 500 is described with respect to the examples of FIG. 6A, it is understood that other unstructured natural language inputs may be the subject of method 500.

Referring back to FIG. 5, the method 500 includes process 502 for determining the structure of an entity classifier, a training process 504 for training the entity classifier, and an inference process 506 for using the entity classifier to generate identified entities.

In some embodiments, process 502 includes processes 508 and 510. At process 508, where the structure (e.g., a neural network model type) of a base neural network classifier 404 of an entity classifier 400 is determined. In some embodiments, the base neural network classifier 404 may be implemented with an RNN, including for example, a bidirectional RNN (BRNN), a bidirectional LS™ (Bi-LS™) RNN, a gated recurrent unit (GRU) RNN, and any suitable type of RNN.

At process 510, the structure (e.g., total number N of the sub-classifiers, entity type(s) associated with each sub-classifier, etc.) of a hierarchical neural network classifier 406 is determined. In some embodiments, the structure of the hierarchical neural network classifier 406 is determined automatically based on a confusion matrix obtained using training dataset. In an example, the hierarchy of the hierarchical neural network classifier 406 is based on spectral clustering of the confusion matrix. In an example, it is determined that the hierarchy of the hierarchical neural network classifier 406 includes sub-classifiers 408-1 and 408-2. In that particular example, sub-classifier 408-1 is associated with types indicating whether a word is a named entity (indicated by "Entity") or not (indicated by "Other"). For a particular word X, sub-classifier 408-1 may generate conditional likelihoods P(Other|X) and P(Entity|X). Sub-classifier 408-2 is associated with the rest of the entity types (e.g., "Organization" and "Time"), and for a particular word X, may generate conditional likelihoods P(Organization|X) and P(Time|X).

In some embodiments, training process 504 is performed to train the entity classifier 400. In some embodiments, various loss weighting schemes (e.g., sample weights, class weights, any other suitable loss weighting schemes, and/or a combination thereof) may be used in the training process 504. In some examples, sample weights with median frequency balancing are used for optimal training. In some embodiments, a focal loss is used in the training process 504 to address the long tail accumulation of error by a class that is dominantly represented in the dataset (e.g., 80% of the dataset is of class "Other"). In an example where entities during training is sparse and far between, a combination of hierarchical classification, weights (e.g., sample and/or class weights) of entities assigned to each example, and focal loss is used to improve training performance.

In the example of method 500, the training process 504 includes processes 512, 513, and 514. At process 512, a first training process may be performed to train the base neural network classifier 404 only (e.g., without training the hierarchical neural network classifier 406) using a global training dataset. In some examples, the base neural network classifier 404 may be global or generic for all users of the database system (such as multi-tenant database system 116 accessible by a plurality of separate and distinct organizations or entities). In an example, the global training dataset may include a large number of samples (e.g., using texts from Wikipedia). Training with a global model is performed such that the base neural network classifier 404 learns the language that it is intended to use. For example, the model doesn't need to learn a language (e.g., English) from scratch using the limited set of examples in a customer training dataset associated with a particular user.

At process 513, a training process may be performed to train the base neural network classifier 404 using a custom training dataset with entity definitions associated with a particular user of the database system. In an example, at process 513, the training is performed without the hierarchy. Then a confusion matrix of the model against a held out dataset (e.g., a small portion set aside on the custom training dataset) is computed. The confusion matrix is used to build the hierarchy (e.g., by determining the structure of the hierarchical neural network classifier 406) into the network. In an example, the hierarchy is determined by the entities that the model is not able to tell apart based on the confusion matrix.

At process 514, a training process may be performed to train the hierarchical neural network classifier 406 and the base neural network classifier 404 using a custom training dataset associated with a particular user of the database system (e.g., the held out dataset of process 513, the same custom training dataset as used at process 513, or a different custom training dataset). In an example, a number of samples in the custom training dataset may be much less than the number of samples of the global training dataset. For example, a number of samples in the custom training dataset may be less than 0.01% of the number of samples of the global training dataset. The base neural network classifier 404 may be fine-tuned using the custom training dataset.

It is noted that while different training processes for the base neural network classifier 404 and hierarchical neural network classifier 406 are described, in alternative embodiments, the base neural network classifier 404 and hierarchical neural network classifier 406 may be trained in a single training process with the same training dataset.

In some embodiments, inference process 506 for entity recognition includes processes 516, 518, 520, 524, and 526. In an example, at process 516, unstructured audio input is received. In some examples, the unstructured audio input may be captured by a microphone of a user device, such as user device 310. In some examples, the unstructured audio input may be encoded into an audio file according to a standard audio encoding, such as an MP3 file and/or the like. In some examples, the unstructured audio input may additionally include a list of time indexes corresponding to additional user interactions with the user interface that the user may use to annotate the unstructured audio input. In some examples, the additional user interactions may include a button press and/or the like. In some examples, the annotations may correspond to a marker indicating the start of an action item and/or the like to aid in the parsing of the unstructured audio input. In some examples, the unstructured audio input may be received as part of an API call, a remote procedure call, a HTTP post, and/or the like.

In some embodiments, at process 516, the unstructured audio input is converted to natural language text. In some examples, process 516 may be performed with the aid of a voice to text service, such as voice to text service 382. In some examples, the conversion may include using one or more neural networks and/or APIs for performing speech recognition on the unstructured audio input to recognize natural language captured in the audio. In some examples, the conversion may further include recognizing special key words or phrases and converting them into annotations and/or separators in the text. In some examples, the phrase "action item" may be replaced with a special separator indicating the start of an action item that is processed as is described in further detail below. In some examples, a list of time indexes received may also be used to insert corresponding annotations and/or separators into the natural language text. In some examples, the natural language text may further be parsed to add appropriate white space (e.g., carriage returns, new lines, and/or the like) to separate sentences, indicated pauses and/or periods of silence in the audio, and/or the like.

In some examples, the natural language text may correspond to natural language text 600 of FIG. 6A. As shown in FIG. 6A, natural language text 600 illustrates an example of the kind of natural language text that may correspond to an unstructured input. Without loss of generality, the processing of natural language text 600 is described with respect to a sentence; however other groupings such as phrases, paragraphs, utterances, and/or the like may also be used.

At process 518, the base neural network classifier 404 is used to provide context information associated with the unstructured text input (e.g., natural language text 600). At process 520, the sub-classifiers 408-1 through 408-N of the hierarchical neural network classifier 406 may generate lower-level entity identifications (e.g., conditional likelihoods P(Entity|X), P(Organization|X)) using the context information. In an example, for "Acme," sub-classifier 408-1 provides a conditional likelihood P(Entity|"Acme") (e.g., 89%) and sub-classifier 408-2 provides a conditional likelihood P(Organization|"Acme") (e.g., 95%).

At process 520, a combiner 410 of the hierarchical neural network classifier 406 may generate one or more higher-level entity identifications (e.g., including a joint likelihood of P(Entity, Organization|X). In an example, for a particular word X, a single higher-level entity identification is generated using N lower-level entity identifications from N sub-classifiers 408-1 through 408-N respectively. In an example, the combiner 410 may multiple the conditional likelihoods of the N lower-level entity identifications to generate the higher-level entity identification (e.g., P(Organization, Entity"Acme")=P(Entity|"Acme")*P(Organization|"Acme") =89%*95%=85%).

At process 526, identified entities may be generated using the one or more higher-level entity identifications from the combiner. In the example of FIG. 6B, the identified entities include the higher-level entity identifications 656, 658, 660, and 662 generated by the neural network models of the entity classifier 400. Each of the higher-level entity identifications includes a type of entity 650, a value of entity 652, and a confidence level 654. In the examples of natural language text 600, the entity recognition may recognize organization corresponding to "Acme"; person corresponding to "Chris Quintana"; time corresponding to "11:30 AM EDT; location corresponding to "Chez Cuisine".

In the describe example of method 500, the identified entities only include results provided by an entity classifier using neural network models. As discussed below with reference to FIGS. 7A, 7B, and 7C, in alternative embodiments, a hybrid solution may be provided such that the identified entities may include results both from an entity classifier using neural network models and a deterministic solution without using neural network models. Referring to FIG. 7A, an example method 700 of using a hybrid solution for entity recognition is illustrated. In some embodiments, a deterministic NER offering a precision guarantee of 100% though recall (the universe of possibility of representing the entity) could be bad. In such embodiments, when deterministic NER returns a positive prediction, the deterministic model result is selected as the identified entities, and when deterministic NER returns a negative prediction, the neural network model result is selected as the identified entities. Such a hybrid solution eliminates the use of another model for arbitrating between the neural network model NER and deterministic NER.

At process 702, an unstructured text input is received. At process 704, a plurality of entity identifications associated with the unstructured text input may be generated using a neural network model (e.g., using method 500 and/or entity classifier 400).

At process 706, one or more entity identifications associated with the unstructured text input are generated using a deterministic model, and such entity identifications are also referred to as deterministic entity identifications. In some embodiments, the deterministic model does not use a neural network model. The deterministic model may use rules, regular expressions, or a combination thereof. For example, the deterministic model may perform recognition of monetary amounts, percentages, dates, and/or times based on one or more special characters (e.g., dollar signs, euro signs, colons, percentage symbols, slashes, etc.), special letters (e.g., "EDT" for eastern day time, "k" for 1000), and/or the like. In some examples, the recognition of dates may use one or more rules for interpreting relative information such as "today", "two weeks", "one hour". "noon", and/or the like and/or incomplete information such as "July 1st" to refer to the current year unless the current date is after July 1st of the current year. In some examples, the deterministic model for entity recognition may include determining a value for the entity in a standard format, such as converting dates based on the Unix epoch, times based on UTC time, and/or the like. In some examples, the recognized entities may be optionally sorted based on their confidence level, their index, their type, and/or any combination of these properties. In some embodiments, the confidence level for the deterministic entity identifications may be 100% or almost 100%.

Referring to FIG. 7B, illustrated is an example of the result 740 from process 706, which includes a deterministic entity identification 750 of the natural language text 600. The deterministic entity identification 750 identifies "11:30 AM EDT" as Time with a confidence level of 100%.

Referring back to FIG. 7A, at process 708, a hybrid solution generates identified entities using the first and second plurality of entity identifications. As shown in the example of FIG. 7C, the hybrid result 760 includes identified entries 656, 658, and 660 generated using neural network models and identified entry 750 generated using a deterministic model. Comparing tables 640 and 760, it is noted that the hybrid solution replaced identified entry 662 for "11:30 AM EDT" generated using neural network models with the identified entry 750 generated using a deterministic model. In some embodiments, at process 708, when deterministic NER returns a positive prediction, the deterministic model result is selected as the identified entities, and when deterministic NER returns a negative prediction, the neural network model result is selected as the identified entities. As such, the hybrid solution eliminates the use of another model for arbitrating between the neural network model NER and deterministic NER.

Referring to FIGS. 8 and 9, systems and methods for entity recognition using confidence thresholds are described. FIG. 8 illustrates a decision flow 800 for presenting a user with entity recognition based on confidence level according to some embodiments. FIG. 9 is a flowchart of a method 900 for configuring the training of a neural network (e.g., an entity classifier 400) using confidence thresholds according to some embodiments.

Referring to FIG. 8, for any given unstructured text sequence input into a neural network (e.g., an entity classifier 400), there is a possibility that the neural network will not be able to make a determination or classification (e.g., as to the entity of a particular word), and it may need to ask or query the user for more or different information (e.g., "I don't understand," at 820).

Even when the neural network is able to make a determination or classification, there is a possibility that the determination is wrong. The probability that the determination or classification is correct can be viewed as the level of "confidence" in that result. In the situation where there is some possibility that the determination or classification is wrong (i.e., less than 100% confidence), a choice can be made as to whether the determination/classification should still presented or returned to the user (e.g., "I understand," at 810) or whether to the query the user for more information (e.g., "I don't understand," at 820). The probability or percentage of presenting the user with a determination or classification of entity—even if there is a chance that it is wrong—can be viewed as "recall."

When presented with the determination or classification, the user is able to see whether the determined or classified result is correct (at 830) or incorrect (at 840). The probability that the user is presented with a determination or classification that is correct may be viewed as the perceived "precision" of the neural network. As a corollary, the false discovery rate (FDR) of the neural network is the probability that presented determination/classification is incorrect: Precision=1−FDR.

While the neural network can be global or generic for all users of the database system (such as multi-tenant database system 116 accessible by a plurality of separate and distinct organizations or entities), not all users may require or need the same level of precision. For example, some organizations may want a very high level of precision (e.g., over 95%), whereas other organizations would be satisfied with a lower level of precision (e.g., 80%).

As a general matter, the precision of the neural network will increase with more training or exposure to more training data sets. In some embodiments, a framework is provided by which an organization or entity can determine, control, or configure the training of the neural model so that it returns determinations or classifications at the level of precision desired by or acceptable to that organization or entity.

According to some embodiments, additional data for training can be obtained by configuring whether or not to present a determination or classification depending on its confidence level. If the confidence level is high (indicating a greater probability that the determination/classification is correct), the system will present the determination or classification to the user. On the other hand, if the confidence level is low (indicating a greater probability that the determination/classification is incorrect), the system may query the user for more information (e.g., "I don't understand," or "Pardon me, please say differently), basically, asking the user to try again. Any information received from the user is then fed back into the neural network for processing and training.

For organizations or entities desiring higher precision (or lower FDR), the threshold confidence level at which a determination or classification is presented to a user can be set relatively high. For any determination/classification falling below this threshold, the system will query or prompt the user for more information. While there is a greater chance that any determinations or classifications presented to the users will be correct, there may be a greater likelihood that the users are asked to retry. (The opposite will be true if the threshold confidence level is set relatively low.) But with each retry, the neural network is provided with more diverse training data (in the form of alternate examples of utterances or text sequences) from which it can learn.

FIG. 9 is a flowchart of a method 900 for configuring the training of a neural network (e.g., an entity classifier 400) according to some embodiments. Method 900 allows an organization or entity (e.g., product owner or manager) to control or set training so that the classifier or network outputs determinations or classifications (e.g., of entities) at a level of precision that is acceptable to the organization or entity, and can provide for training on more or less additional data sets. In some embodiments, method 900 may be performed by a computing device (e.g., 100), either separate from or implementing a neural network (e.g., entity classifier 400).

At a process 910, the computing device receives, e.g., from an organization or entity, an acceptable false discovery rate (FDR), which is the tolerance (fraction of predictions) of the neural network model to predict or classify something wrong. Above such tolerance, users of the database system from that organization or entity might get frustrated.

At a process 915, the computing device determines a required level of precision for the determinations or classifications returned by the classifier or neural network: Precision=1−FDR.

As explained above, the actual precision of the classifier or neural network is a function of the recall level and confidence threshold at which determinations or classifications are presented to a user. In other words, precision, recall, and confidence threshold are related. At a process 920, using the required precision of the system to look up against the computed Precision-Recall (PR) curve, the computing device determine the corresponding confidence threshold (this threshold is used against the probability returned for each prediction by the neural network model). In some embodiments, the computing device calculates, derives, or determines an appropriate confidence threshold, for example, by consulting or referencing a precision-recall (PR) curve and bilinear/bicubic intrapolation. Any predictions of the neural network model (e.g., entity classifier) below this confidence threshold are not accepted; any predictions of entities above the confidence threshold are accepted.

At a process 930, the computing device calculates, derives, or determines a corresponding (best possible) recall level. In some embodiments, this can be accomplished using the PR curve and determined confidence threshold.

At a process 940, the neural network is then operated, with its determinations or classifications presented to users at the determined recall level. When operating the classifier or neural network, the concept of user perceived recall is used. Perceived recall relates to the number of times that the user is required or requested to provide alternative utterance for conveying the classification using natural language until the neural model generates or determines the right classification. In some embodiments, this number of tries can be set, configured, or decided by the entity or organization (e.g., product owner or manager).

At a process 950, the computing device determines whether operation of the classifier or neural network at the perceived recall level is acceptable to the entity or organization. If not, at a process 960, the computing device receives more training data with diverse examples. This may be accomplished, for example, by prompting or querying users for alternate utterance or text sequences. The processes are repeated until the neural network reaches an acceptable level of performance. Then, at process 970, training is complete.

Some examples of computing devices, such as users systems 112, database system 116, user device 310, server 330, multi-tenant system 360, and/or support server 370 may include non-transitory, tangible, machine-readable media that include executable code that when run by one or more processors (e.g., processor system 112A, processor system 117, processor 332, and/or processor 372) may cause the one or more processors to perform the processes of methods 500, 700, 800, and/or 900. Some common forms of machine readable media that may include the processes of methods 500, 700, 800, and/or 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for natural language processing, the method comprising:
    providing an entity classifier including a base neural network classifier and a hierarchical neural network classifier;
    performing a global training process on a base neural network classifier, without training the hierarchical neural network classifier, using a global training dataset, for a plurality of users;
    after performing the global training process, performing a custom training process on the base neural network classifier and the hierarchical neural network classifier, using a custom training dataset, for a first user of the plurality of users;
    receiving, by one or more processors, an unstructured text input;
    after performing the global training process and the custom training process, identifying, using the entity classifier, entities in the unstructured text input, wherein the identifying the entities includes:
        generating, using a plurality of sub-classifiers of the hierarchical neural network classifier of the entity classifier, a plurality of lower-level entity identifications associated with the unstructured text input; and
        generating, using a combiner of the hierarchical neural network classifier, one or more higher-level entity identifications associated with the unstructured text input based on the plurality of lower-level entity identifications; and
    providing identified entities based on the one or more higher-level entity identifications.

2. The method of claim 1, further comprising:
    updating a data store based on the identified entities.

3. The method of claim 1, wherein each identified entity includes a type of an entity, a value of the entity, and a confidence level in the identification.

4. The method of claim 3, wherein a type of the entity is selected from a group consisting of an organization, a person, a date, a time, a percentage, a monetary value, and a pick list type.

5. The method of claim 1, wherein the plurality of sub-classifiers are automatically determined using a confusion matrix.

6. The method of claim 1, further comprising:
    providing, using the base neural network classifier of the entity classifier, context information associated with the unstructured text input; and
    generating, using the plurality of sub-classifiers of the hierarchical neural network classifier, the plurality of lower-level entity identifications based on the context information.

7. The method of claim 1, wherein a size of the global training dataset is greater than a size of the custom training dataset.

8. The method of claim 1, wherein the base neural network classifier includes a base neural network model; and
    wherein each sub-classifier of the hierarchical classifier includes a custom neural network model.

9. The method of claim 8, wherein each of the base and custom neural network models includes a bidirectional recurrent neural network (BRNN) model.

10. The method of claim 8, wherein the base neural network model and custom neural network model are implemented with different types of neural network models.

11. The method of claim 1, further comprising:
    providing, using a deterministic model, one or more of deterministic entity identifications associated with the unstructured text input; and
    generating the identified entities using the one or more higher-level entity identifications and one or more deterministic entity identifications.

12. A non-transitory machine-readable medium comprising executable code which when executed by one or more processors associated with a computing device are adapted to cause the one or more processors to perform a method comprising:
    providing an entity classifier including a base neural network classifier and a hierarchical neural network classifier;
    performing a global training process on a base neural network classifier, without training the hierarchical neural network classifier, using a global training dataset, for a plurality of users;
    after performing the global training process, performing a custom training process on the base neural network classifier and the hierarchical neural network classifier, using a custom training dataset, for a first user of the plurality of users;
    receiving an unstructured text input;
    after performing the global training process and the custom training process, identifying, using the entity classifier, entities in the unstructured text input, wherein the identifying the entities includes:
        generating, using a plurality of sub-classifiers of a hierarchical neural network classifier of the entity classifier, a plurality of lower-level entity identifications associated with the unstructured text input; and
        generating, using a combiner of the hierarchical neural network classifier, one or more higher-level entity identifications associated with the unstructured text input based on the plurality of lower-level entity identifications; and
    providing identified entities based on the one or more higher-level entity identifications.

13. The non-transitory machine-readable medium of claim 12, wherein each identified entity includes a type of an entity, a value of the entity, and a confidence level in the identification.

14. The non-transitory machine-readable medium of claim 12, wherein the method further comprises:
    providing, using the base neural network classifier of the entity classifier, context information associated with the unstructured text input; and
    generating, using the plurality of sub-classifiers of the hierarchical neural network classifier, the plurality of lower-level entity identifications based on the context information.

15. The non-transitory machine-readable medium of claim 12, wherein the base neural network classifier includes a base neural network model; and
    wherein each sub-classifier of the hierarchical classifier includes a custom neural network model.

16. The non-transitory machine-readable medium of claim 12, wherein the method further comprises:
    providing, using a deterministic model, one or more deterministic entity identifications associated with the unstructured text input; and
    generating the identified entities based on the one or more higher-level entity identifications and one or more deterministic entity identifications.

17. A computing device comprising:
    a memory; and
    one or more processors coupled to the memory;
    wherein the one or more processors are configured to:
        provide an entity classifier including a base neural network classifier and a hierarchical neural network classifier;
        perform a global training process on a base neural network classifier, without training the hierarchical neural network classifier, using a global training dataset, for a plurality of users;
        after performing the global training process, perform a custom training process on the base neural network classifier and the hierarchical neural network classifier, using a custom training dataset, for a first user of the plurality of users;
        after performing the global training process and the custom training process, identify, using the entity classifier, entities in an unstructured text input, wherein the identifying the entities includes:
            generating, using a plurality of sub-classifiers of the hierarchical neural network classifier of the entity classifier, a plurality of lower-level entity identifications associated with the unstructured text input; and
            generating, using a combiner of the hierarchical neural network classifier, one or more higher-level entity identifications associated with the unstructured text input based on the plurality of lower-level entity identifications; and
        provide identified entities based on the one or more higher-level entity identifications.

18. The computing device of claim 17, wherein each identified entity includes a type of an entity, a value of the entity, and a confidence level in the identification.

19. The computing device of claim 18, wherein a type of the entity is selected from a group consisting of an organization, a person, a date, a time, a percentage, a monetary value, and a pick list type.

20. The computing device of claim 17, wherein the one or more processors are configured to:
    provide, using a deterministic model, one or more of deterministic entity identifications associated with the unstructured text input; and
    generate the identified entities using the one or more higher-level entity identifications and one or more deterministic entity identifications.

* * * * *